Oct. 1, 1940.  F. REIMSPIESS  2,216,456

POWER VEHICLE

Filed Sept. 12, 1939  2 Sheets-Sheet 1

INVENTOR
FRANZ REIMSPIESS
BY
ATTORNEYS

Oct. 1, 1940.   F. REIMSPIESS   2,216,456
POWER VEHICLE
Filed Sept. 12, 1939   2 Sheets-Sheet 2

INVENTOR
FRANZ REIMSPIESS
BY
ATTORNEYS

Patented Oct. 1, 1940

2,216,456

UNITED STATES PATENT OFFICE

2,216,456

POWER VEHICLE

Franz Reimspiess, Stuttgart, Germany, assignor to Dr. ing. h. c. F. Porsche K.-G., Stuttgart-Zuffenhausen, Germany, a German company Application September 12, 1939, Serial No. 294,546
In Germany September 9, 1938

8 Claims. (Cl. 180—54)

This invention relates to a power vehicle, and more particularly to the mounting of the engine and its auxiliary devices on such vehicle.

An object of this invention is to provide an arrangement whereby an engine and its accessory devices may be mounted in a vehicle so as to provide ready access to all such accessory devices.

Another object of this invention is an arrangement for mounting an engine and its accessory devices so as to consume a minimum of space in a vehicle.

Still another object of this invention is to provide a novel mounting for an engine and its auxiliary devices in the rear of a vehicle body.

A further object of this invention is to mount an engine and its auxiliary devices within a minimum space and with a maximum accessibility at the rear of a vehicle.

A more specific object of this invention is to mount the auxiliary devices for an internal combustion engine all substantially within a plane transverse to the engine itself, said engine having horizontal cylinders and positioned below said auxiliary devices.

With the foregoing and other objects in view which will appear as the description proceeds, the invention resides in the combination and arrangement of parts and in the details of construction hereinafter described and claimed.

Figure 1:
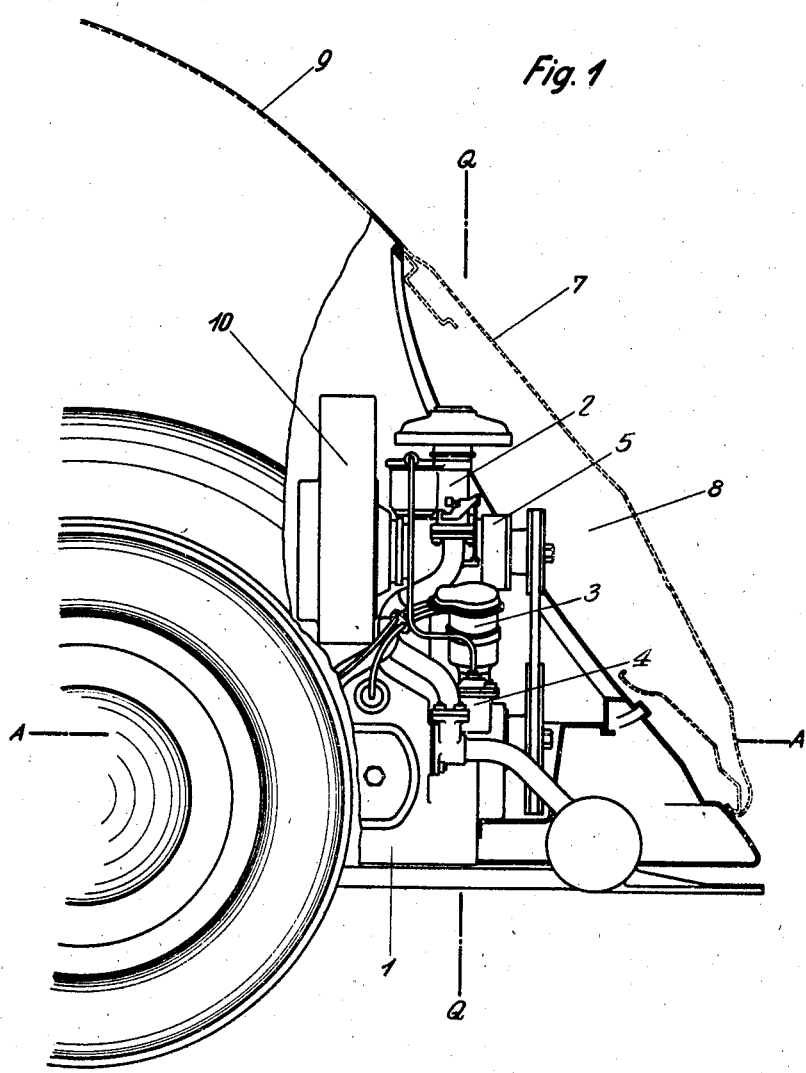
Figure 2:
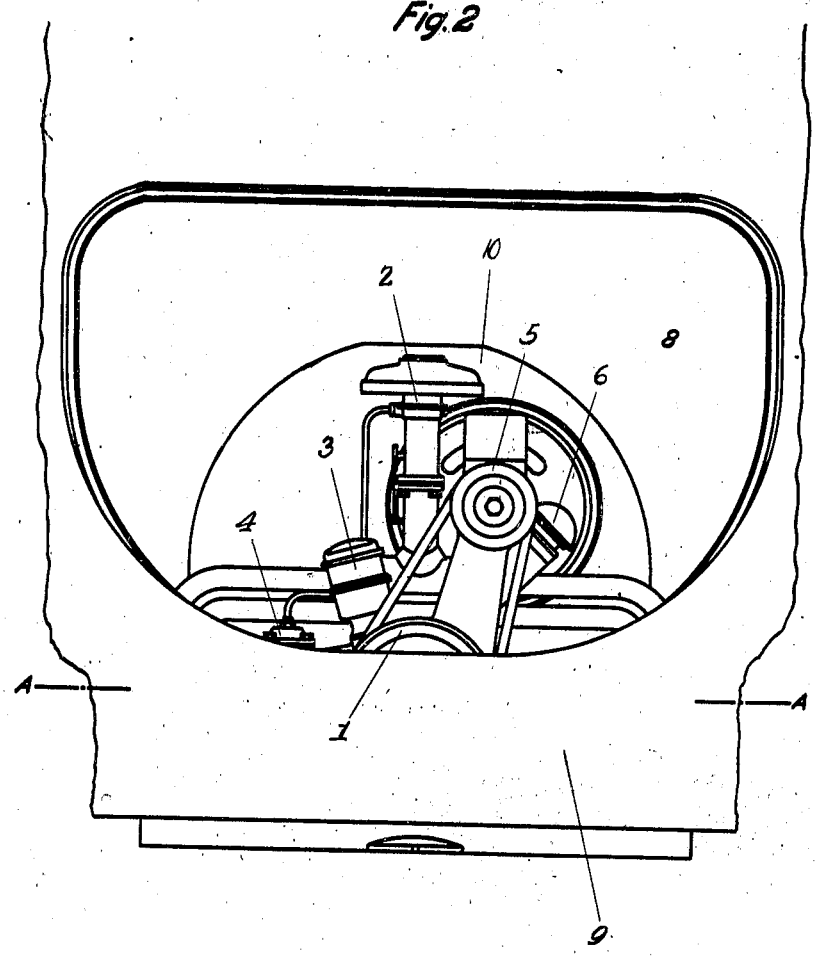

The invention has been illustrated in its preferred embodiment in the accompanying drawings, wherein:

Fig. 1 is a side view, partially in cross-section, of a vehicle body having an engine mounted in the rear thereof in accordance with the principles of this invention; and Fig. 2 is a view of the engine and body arrangement from the rear, the rear motor deck being left uncovered.

In accordance with a preferred arrangement, the vehicle driving engine 1 is mounted at the rear end of the vehicle and is of the type having substantially horizontally mounted cylinders lying in the plane indicated as A—A. The usual auxiliary devices and appurtenances of the vehicle engine have been indicated as a carbureter 2, shown with an air filter, a spark distributor 3, fuel pump 4, generator 5 and a capped intake pipe 6 for the oil supply, preferably mounted upon the support for the generator 5. All of these parts, as will be seen from the drawings, are preferably mounted in an opening 8 at the rear of the vehicle body wall 9, which may, if desired, be covered by suitable means such as the cover 7. It is to be noted furthermore, that the auxiliary devices are not only all mounted substantially within a transverse vertical plane Q—Q, but are also distributed fanwise in this plane. This, therefore, permits a ready accessibility to all of these parts, while mounting them within a substantially single plane does not increase the length of the engine as a whole, and thereby increases the useful space within the vehicle body. It is to be also noted that the carbureter 2 which requires the greatest amount of adjustment and cleaning is mounted above and slightly behind the other elements and is accessible not only from above and behind, but also from the side. The remaining devices can readily be reached from the top rear and one side so that the adjustment thereof can also be readily effected.

If the rear engine is provided with a cooling blower 10 the auxiliary devices for the engine are preferably positioned in front of the blower, as viewed from the rear. If the engine is water-cooled, a suitable radiator may be substituted for the blower and the water pump will then be coplanar with the remaining auxiliary devices.

The aforedescribed arrangement has the further advantage that the control cables, conduits, wires, etc. leading to the auxiliary devices can take their position without interfering with one another and without interfering with the accessibility of the devices for attendance.

It will be obvious to those skilled in this art that the type of internal combustion engine contemplated is of no importance. If an ordinary gasoline engine is to be used, the auxiliary devices previously discussed will be mounted in the manner proposed. If the engine is a Diesel engine the comparable necessary auxiliary devices will be similarly positioned. Furthermore, the particular mounting of the cylinders of the engine is without importance. They may be mounted in an opposed relationship or in horizontal planes lying at an angle to one another.

A further advantage of the construction formed in accordance with the principles of this invention lies in the fact that it readily adapts itself to a vehicle body having a stream-lined configuration. Although the engine and its auxiliary devices are recessed within the outer dimensions of the body, thereby permitting a smooth outer surface, all these parts are at the same time readily accessible.

It will be seen that I have provided a construction which satisfies the objects enumerated above, and while I have shown the invention in a certain physical embodiment, it is to be understood that modifications of the structure shown may be made by those skilled in this art without departing from my invention as expressed in the following claims.

I claim:

1. In a vehicle, in combination, an internal combustion engine having substantially horizontally positioned cylinders, auxiliary devices for said engine including a carbureter, distributor, fuel pump and the like, and means for mounting said auxiliary devices substantially within a vertical plane transverse to said internal combustion engine.

2. The combination according to claim 1, in which said last means includes means for mounting said carbureter and distributor fanwise within said plane.

3. The combination according to claim 1, in combination with a cooling means for said engine having its axis parallel to the axis of said engine, and means for mounting said cooling means forwardly of said auxiliary devices.

4. In a vehicle, in combination, an internal combustion engine having substantially horizontally positioned cylinders mounted at the rear end of said vehicle, a body for said vehicle having a downwardly sloping rear deck provided with an opening exposing said engine, a plurality of auxiliary devices for said engine including a carbureter, distributor, fuel pump, generator, and the like, and means for mounting said auxiliary devices in a rearwardly ascending manner as viewed from said opening.

5. The combination according to claim 4, in combination with a cooling means for said engine, and means for mounting cooling means rearwardly of said auxiliary devices, as seen from said opening.

6. The combination according to claim 4, in which said last means includes means for mounting said carbureter and distributor fanwise with respect to one another.

7. The combination according to claim 4, in combination with an oil inlet pipe supported on the mounting for said generator.

8. In a vehicle, in combination, an internal combustion engine having substantially horizontally positioned cylinders, a plurality of auxiliary devices for said engine including a carbureter, distributor, fuel pump, generator, oil inlet pipe and the like, and means for mounting said auxiliary devices substantially within a vertical plane transverse to said internal combustion engine, said means including means for supporting said oil inlet pipe on the mounting for said generator.

FRANZ REIMSPIESS.